A. KILLANDER.
BAND SAW GUIDE.
APPLICATION FILED MAR. 4, 1920.
1,357,328. Patented Nov. 2, 1920.
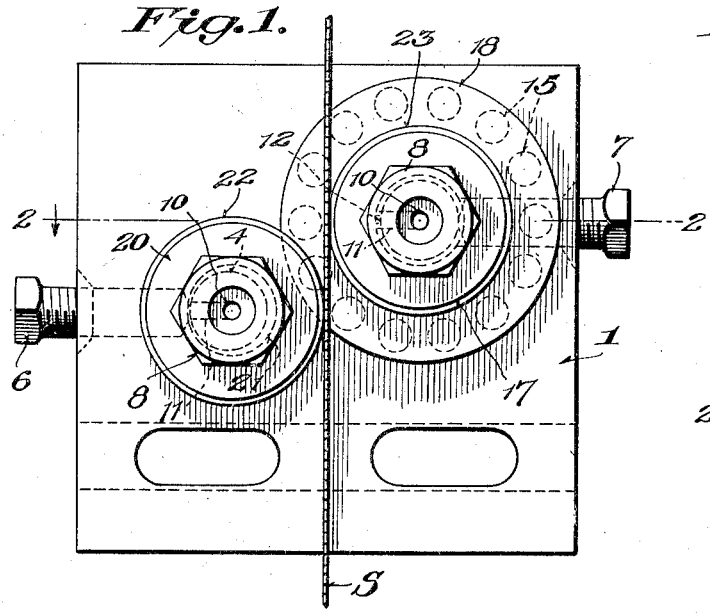
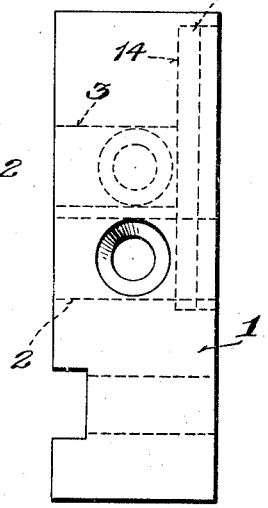
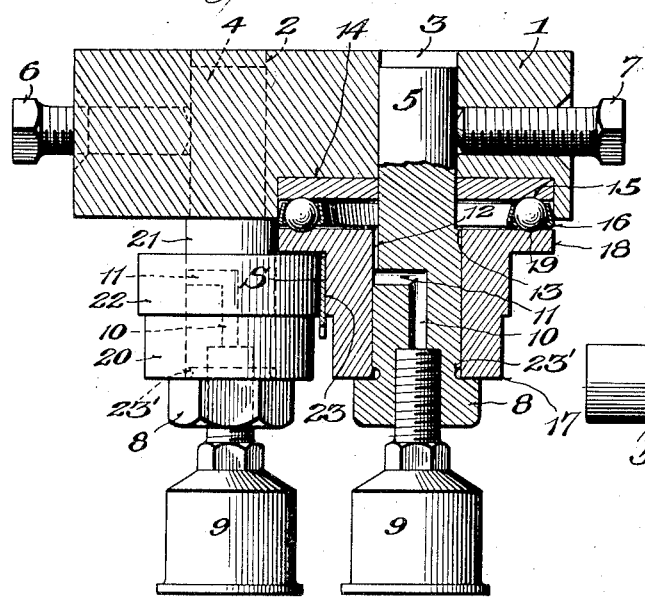
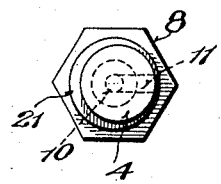
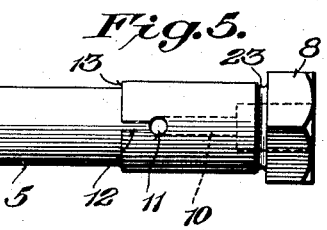
Witness
Chas. L. Griesbauer.
Inventor
Axel Killander,
By
Attorney

UNITED STATES PATENT OFFICE.

AXEL KILLANDER, OF CHICAGO, ILLINOIS, ASSIGNOR TO WHITEHEAD SALES CO., OF CHICAGO, ILLINOIS.

BAND-SAW GUIDE.

1,357,328.     Specification of Letters Patent.     Patented Nov. 2, 1920.

Application filed March 4, 1920. Serial No. 363,239.

*To all whom it may concern:*

Be it known that I, AXEL KILLANDER, a subject of the King of Sweden, residing at Chicago, in the county of Cook and State of Illinois, have invented certain new and useful Improvements in Band-Saw Guides, of which the following is a specification.

This invention relates to certain new and useful improvements in band saw guides and pertains to band saws generally used in the art of working any material.

The primary object of the invention is to provide an improved guide for a band saw which will efficiently support and guide the saw preventing sticking and binding and thereby eliminate the wearing of flat spots on the side of the saw which later seriously affects the accuracy of the saw cut in materials by rendering the cut slanted or irregular.

The invention further aims to provide improved means for effecting lubrication of the parts.

In the drawings:—

Figure 1, is a front elevation of the invention:

Fig. 2, is a section taken on line 2—2 of Fig. 1;

Fig. 3, is an end elevation:

Fig. 4, is an end view of one of the stub-shafts, or journal pins; and

Fig. 5 is a side elevation of Fig. 4.

In proceeding in accordance with the present invention, a base block 1, is employed, which may be bolted or otherwise suitably attached to the frame of the machine. The block 1, is formed with bores 2 and 3 in which stub-shafts or journal pins 4 and 5 are received and are provided with hexagonal heads 8 that have threaded apertures therein to receive the shanks of grease cups 9. Longitudinal lubricant passages 10 are formed in the pins and have lateral inner terminals 11 communicating with peripheral distributing grooves 12 which latter extend through shoulders 13 formed by reducing the ends of the pins which engage in the bores 2 and 3. The grease cups may be of any desired force-feed type.

The block 1, is formed with an annular recess or chamber 14 extending through a face thereof and in which is received a ball race 15 the balls of which are held by a retainer 16 so as to project outwardly from the adjacent face of the block 1.

A roller 17 is mounted on pin 5 and is formed with an enlarged circular base flange 18 provided with a ball race 19, the outer end of the roller being engaged by the head 8 of the journal pin. By loosening the screws 7 and moving the pins longitudinally, the ball bearing may be adjusted as is obvious, following which the screws are again tightened to rigidly secure the pins. A smaller roller 20 is mounted on the pin 4 and has a reduced circular part 21 lying opposite to the flange 18, the rollers having coöperating circular parts 22 and 23 between which the saw S is received and guided. The base flange 18 of the roller 17 further provides a guide limiting lateral movement of the saw as is depicted in Fig. 2, due to the flange 18 underlapping the guide part 22 of roller 20. The roller 20 is thus mounted so as to partake of the benefits of the ball bearing mounting provided for roller 17.

In order to trap lubricant working outwardly toward the heads 8, the pins are provided with annular grooves 23' located adjacent the heads.

From the foregoing it will be seen that there is no likelihood of the larger roller 17 sticking or binding and since the smaller roller 20 rotates only on its pin and against the flange 18, the saw is freely and efficiently guided.

The groove or passage 12 further leads into the chamber 14, consequently lubricant collecting in chamber 14 adjacent the pin 5 can subsequently work toward the roller 17 to thus maintain the latter lubricated.

What is claimed is:

1. In a band saw guide, a base block having a pair of bores, a journal pin in each bore, the outer face of said block being formed with an enlarged chamber surrounding one of the bores and the pin therein, a ball race member in said chamber, balls engaging in the race and extending outwardly beyond said face of the block, a roller on said pin having a circular flange formed with a race receiving the balls, a roller on the other pin, said rollers having coöperating guide parts receiving the saw therebetween and the flange underlapping the guide part of the roller of the other pin, and screws engaging the pins to adjustably hold same in the respective bores, said pins having heads engaging the outer ends of the rollers.

2. In a band saw guide, a base block having a pair of bores, a journal pin in each bore having a head on its outer end, the outer face of said block being formed with an enlarged chamber surrounding one of the bores and the pin therein, a roller on each pin engaged with the head thereof, the roller of said first named pin having a circular enlarged flange lying opposite to the chamber, a ball-bearing structure in the chamber engaged with the flange of said roller, means to hold the pins adjustably in the bores, and coöperating saw guiding parts on the rollers, the flange of the first named roller underlapping the saw guiding part of the other roller.

3. In a band saw guide, a supporting member, a pair of pins borne by the member, rollers on the pins having coöperating saw guide parts, one of the rollers having a circular flange underlapping a part of the other roller, a ball bearing structure interposed between the flange and the adjacent part of the supporting member, means to enable adjustment of the said roller having the flange and the latter so as to adjust the ball bearing, and means to adjust the other roller to maintain its relation to the first named roller upon adjustment of the latter.

4. In a band saw guide, a supporting block, a pair of pins adjustably borne by the block, means to rigidly hold the pins adjusted, rollers on the pins having coöperating saw guide parts, one of the rollers, having a circular flange underlapping the saw guide part of the other roller, and a ball bearing structure interposed between said flange and the block.

In testimony whereof I affix my signature.

AXEL KILLANDER.